United States Patent
Chamarajnagar et al.

(10) Patent No.: US 11,190,553 B2
(45) Date of Patent: Nov. 30, 2021

(54) GATEWAY ACTION FRAMEWORK

(71) Applicant: VMware, Inc., Palo Alto, CA (US)

(72) Inventors: Ravishankar Chamarajnagar, Atlanta, GA (US); Devanand Kondur, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 49 days.

(21) Appl. No.: 16/724,782

(22) Filed: Dec. 23, 2019

(65) Prior Publication Data

US 2021/0194935 A1    Jun. 24, 2021

(51) Int. Cl.
*H04L 29/06* (2006.01)
*H04L 12/24* (2006.01)
*H04L 29/08* (2006.01)

(52) U.S. Cl.
CPC ........ *H04L 65/104* (2013.01); *H04L 41/0627* (2013.01); *H04L 41/0803* (2013.01); *H04L 65/103* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 2019/0149407 A1* | 5/2019 | Chakrabarti | H04W 4/70 370/254 |
| 2020/0177589 A1* | 6/2020 | Mangalvedkar | H04L 67/12 |
| 2020/0403871 A1* | 12/2020 | AbiEzzi | H04L 67/12 |

* cited by examiner

*Primary Examiner* — Kenny S Lin
(74) *Attorney, Agent, or Firm* — Thomas Horstemeyer, LLP

(57) ABSTRACT

Disclosed are various examples of an action framework for configuring a gateway to perform actions on the gateway itself or in conjunction with connected IoT devices. In some embodiments, a gateway client is permitted on a gateway device using a gateway configuration received from a management service. A command callback function is registered in association the gateway client. An action message is received. The action message specifies an action corresponding to the command callback function. The gateway client using the action message. A command object for the gateway client is generated based on the action message. The command callback function is invoked, and the gateway client processes the command object to perform the action.

20 Claims, 5 Drawing Sheets

GATEWAY ACTION FRAMEWORK

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

Gateway devices and IoT devices can perform actions and commands according to their capabilities. However, the gateway devices and IoT devices can vary greatly in hardware capabilities, operating systems, communication protocols, and other parameters. It can be very costly in time and effort for information technology specialists to manually configure disparate types of IoT devices. While a gateway can be manually configured to communicate with a number of IoT devices, an enterprise can make use of many gateways and many IoT devices. As a result, it can be difficult to configure the gateways and IoT devices to perform the desired actions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to an action framework for configuration of gateway devices and Internet-of-Things (IoT) devices connected through the gateway devices. Manual individual configuration of gateways to perform actions can be complex, slow, and cause inefficiency in an enterprise environment. However, the present disclosure describes an action framework for gateway devices that can improve the efficiency of performing actions on the gateway itself and in concert with IoT devices. The actions can include implementing commands to control IoT devices connected through the gateway device. The actions can also include commands to execute container-based workloads within the gateway device. These workloads can be accessible to client devices, IoT devices, and other networked devices. Administrators and information technology professionals can configure a gateway device to perform actions as directed through a management service.

Figure 1:
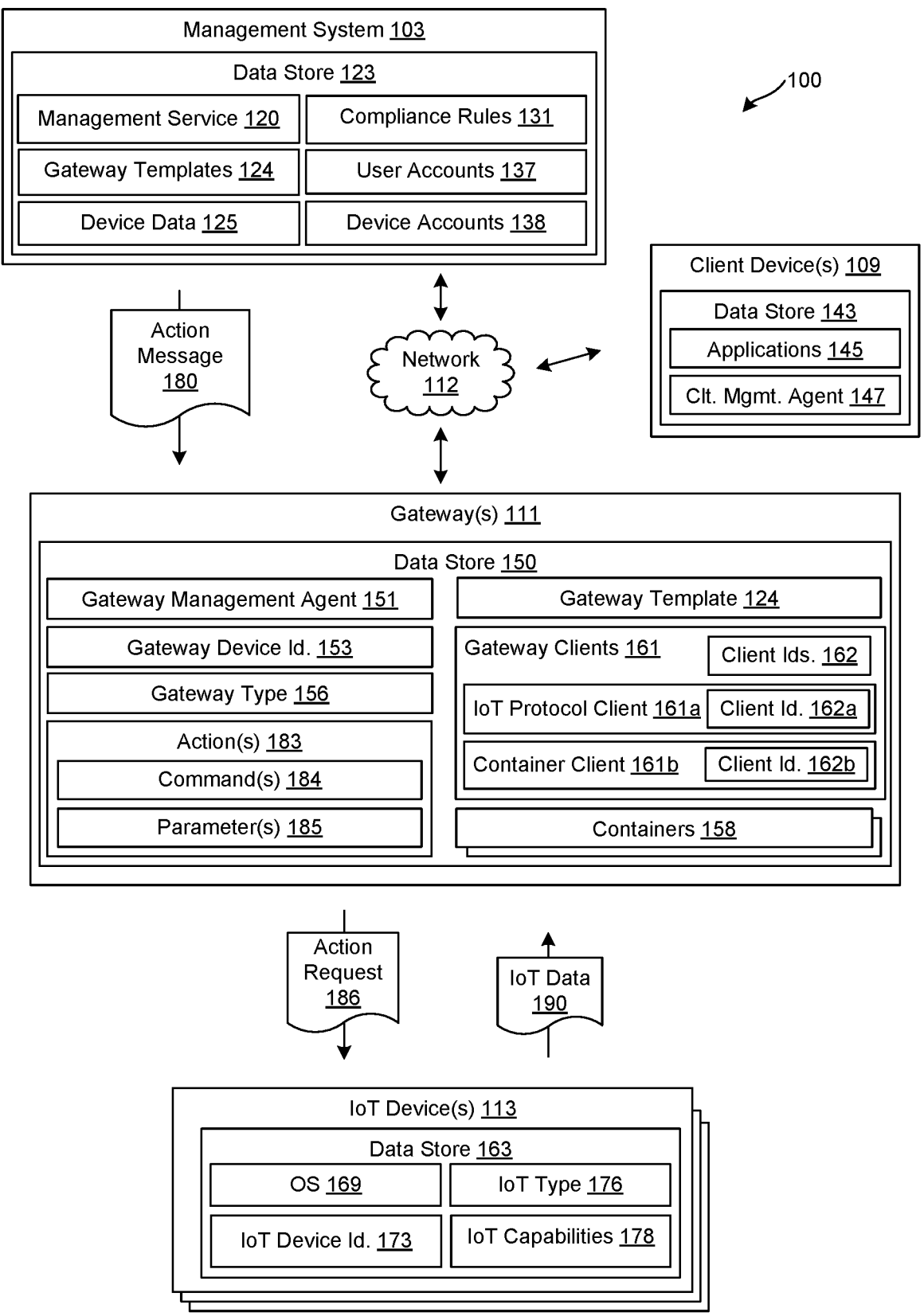
FIG. 1 is a drawing of an example of a networked environment that includes components that implement a gateway action framework.

With reference to FIG. 1, shown is an example of a networked environment 100. The networked environment 100 can include a management system 103, a client device 109, a gateway 111, Internet-of-Things (IoT) devices 113, and other components in communication with one another over a network 112. In some cases, IoT devices 113 and other devices can connect to the network 112 through the gateway 111. The components of the networked environment 100 can be utilized for a gateway action framework. The gateway action framework can include configuring a gateway to perform actions on the gateway itself and in concert with IoT devices 113. The gateway action framework can include utilizing a gateway management agent 151 and gateway clients 161 on the gateway 111 to implement desired actions on the gateway itself and in concert with IoT devices 113. The gateways 111 can include a gateway management agent 151 that communicates with the management service 120 of the management system 103 through direct communication transmissions as well as command queues for the gateways 111. Gateway clients 161 can include applications and instructions that implement actions 183 that are communicated to the gateway management agent 151. Gateway clients 161 can also include client identifiers 162 that can be used to initialize a session with the gateway management agent 151. In order to communicate with IoT devices 113 that utilize a particular IoT protocol, the gateways 111 can be configured to include IoT protocol communication instructions, which can enable communications using IoT protocols. IoT protocols can include BacNet, Profinet, Profibus, LoraWAN, ZigBee, ZWave, MQTT, CoAP, and others.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. The computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided by the management service 120 or any of its components.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103. The data stored in the data store 123 can include management data including gateway templates 124, device data 125, enterprise data, compliance rules 131, user accounts 137, and device accounts 138, as well as other data. The gateway templates 124 can refer to a configuration to apply to one or more gateways 111. The gateway templates 124 can include instructions and policies that govern the operation of gateways 111 and connected IoT devices 113. A gateway template 124 can include a list of permitted, enabled, or whitelisted gateway clients 161 according to their client identifiers 162. Such a list of gateway clients 161 can permit the gateway 111 to install and utilize installed gateway clients 161. A gateway template 124 can also identify a gateway type 156 such as a vendor identifier and model number with which the gateway template 124 is associated. The gateway templates 124 can include or specify IoT templates for IoT types 176 connected to the gateway 111. The IoT templates can govern the implementation of IoT capabilities 178 of an IoT device 113. An IoT type 176 can include a vendor identifier and a model identifier of the IoT device 113. The IoT type 176 can be associated with a general category of the IoT device 113 such as thermostat, light, light switch, and so on.

Device data 125 can identify client devices 109, gateways 111, and IoT devices 113 by one or more of a device identifier, a unique device identifier (UDID), a media access control (MAC) address, an internet protocol (IP) address, or another identifier that uniquely identifies a device with respect to other devices. The device identifiers can include a gateway device identifier 153 of a gateway 111 and an IoT device identifier 173 of an IoT device 113. The device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data, while a client device 109, gateway 111, or IoT device 113 designated as "not enrolled," or having no designation, can be denied access to the enterprise data. In some cases, the enrollment of an IoT device 113 can include registering the IoT device 113 with the management service 120. This registration can include storing a device account 138 that includes an IoT type 176, an IoT device identifier 173, and IoT capabilities 178 that can be performed by the IoT device 113. Enrollment can indicate that an administrative user has authorized the IoT device 113 to communicate with the management service 120. Enrollment can also indicate that the gateway 111 has been provided with instructions to permit the IoT device 113 to access the network 112 and the management service 120 through the gateway 111. In some cases, enrollment of the IoT device 113 can include installation of a profile that enforces compliance rules 131 on the IoT device 113. A client device 109 and a gateway 111 can be likewise enrolled and registered in association with a respective device account 138 that indicates device type, device identifier, and capabilities such as actions 183 and commands 184 that can be performed.

The device data 125 can further include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts 137, device accounts 138, or service accounts associated with each of the devices, the physical locations of each of the devices, the network to which each of the devices is connected, and other information describing the current state of each of the devices. While a user account 137 can be associated with a particular person, a device account 138 can be unassociated with any particular person, and can nevertheless be utilized for client devices 109, gateways 111, or IoT devices 113 that provide certain functionalities, such as automatic functionalities. The IoT device 113 can be associated with a service account or a device account 138 that is user unassociated, or not associated with any person. Each of the gateways 111 can be enrolled with the management service 120, and can be associated with a respective device account 138, such as a gateway account. A device account 138 for a gateway 111 can be referred to as a gateway account. Likewise, each of the IoT devices 113 can be enrolled with the management service 120, and can be associated with a respective device account 138. A device account 138 for an IoT device 113 can be referred to as an IoT device account. A device account 138 for a gateway 111 can be referred to as a gateway device account.

Device data 125 can also include data pertaining to user groups. An administrator can specify one or more of the client devices 109, gateways 111, and IoT devices 113 as belonging to a user group. The user group can refer to a group of user accounts 137, which can include device accounts 138. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department.

Compliance rules 131 can include, for example, configurable criteria that must be satisfied for an enrolled one of the client devices 109, gateways 111, and IoT devices 113 to be in compliance with the management service 120. The compliance rules 131 can be based on a number of factors, including geographical location, activation status, enrollment status, and authentication data, including authentication data obtained by a device registration system, time, and date, and network properties, among other factors associated with each device. The compliance rules can also be determined based on a user account 137 associated with a user. In some cases, a gateway 111 can be unassociated with a user, but can nevertheless be associated with a service account, a device account 138, or another user account 137 that is unassociated with a user.

Compliance rules 131 can include predefined constraints that must be met in order for the management service 120, or other applications, to permit client devices 109 and IoT devices 113 with access to enterprise data and other functions of the management service, as well as connectivity through the gateway 111. The management service 120 can communicate with gateway management agent 151 to determine whether states exist on the gateway 111 that do not satisfy one or more compliance rules 131. States can include, for example, a virus or malware being detected on the device; installation or execution of a blacklisted application; and/or a device being "rooted" or "jailbroken," where root access is provided to a user of the device. Additional states can include the presence of particular files, questionable device configurations, vulnerable versions of applications, vulnerable states of IoT devices 113 or other vulnerability, as can be appreciated.

The management service 120 can communicate with the gateway 111 to determine whether states exist that do not satisfy one or more compliance rules 131 regarding the gateway 111 and IoT devices 113. The IoT device 113 can transmit IoT data 190, such as sensor data or status data to an upstream target, such as an endpoint of the management service 120 or a datacenter. The datacenter can be part of the management system 103, or can be separate from the management system 103. The endpoint can be an IP address, a URL, or other network address identifier. In some cases, the gateway 111 can receive IoT device 113 communications. The gateway 111 can pass or otherwise transmit the IoT data 190 to the management service 120. IoT device 113 can also transmit status data to the management service 120 for evaluation of compliance rules. In some cases, the management service 120 can transmit all or a portion of the compliance rules 131 to the gateway 111. The gateway 111 can determine or evaluate whether states exist, for example on the IoT devices 113, that do not satisfy one or more compliance rules 131, for example, without passing or transmitting the status data to the management service 120. In any case, determining that states exist in the IoT device 113 that do not satisfy one or more compliance rules 131 can trigger transmission of an action 183 or command 184 that causes the IoT device 113 to be in compliance with the compliance rules 131.

The management service 120 can oversee the management of devices including the client devices 109, gateways 111, and IoT devices 113. The management service 120 can oversee the operation of the devices enrolled with the management service 120 as well as enrollment and un-enrollment operations for the devices using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein.

The management service 120 can transmit gateway templates 124 to a gateway 111. The gateway 111 can install, configure, or implement a gateway template 124 to control operation of the gateway 111, as well as the operation of the IoT devices 113. The IoT device 113 can include an IoT capability 178 to sense or collect a particular metric such as temperature, humidity, barometric pressure, or other metrics as IoT data 190. The IoT device 113 can also include properties such as an operating system 169, a software version, a current operational mode, among other properties. The IoT device 113 can also perform certain actions 183. For example, a lighting IoT device 113 can perform an action 183 to set or change configurations including turning a light on and off, setting a lighting color, or setting a lighting intensity level. A lock IoT device 113 can set configurations such as locking or unlocking. A thermostat IoT device 113 can set configurations such as an operational mode, a temperature setting, or a temperature schedule.

The gateway 111 can include gateway clients 161 that implement actions 183. For example, a gateway client 161 such as the IoT protocol client 161a can collect metrics, identify or change properties, set configurations, and perform other actions 183 for an IoT device 113 according to an IoT protocol of the IoT device 113. A gateway template 124 can indicate that the IoT protocol client 161a is enabled, permitted, or whitelisted according to its client identifier 162a. The gateway template 124 can also include the gateway client 161 entity. The gateway template 124 or a subsequent command from the management service 120 can also indicate that the IoT protocol client 161a is associated with specified actions 183 and commands 184. The gateway management agent 151 can register the IoT protocol client 161a in association with these actions 183 and commands 184.

The management service 120 can transmit an action message 180 to the gateway management agent 151. The action message 180 can specify commands 184, as well as arguments and other parameters 185 for an action 183. The action message 180 can also include the client identifier 162a. The IoT protocol client 161a can implement the commands 184 according the parameters 185 in order to perform the action 183. For example, arguments or parameters 185 can indicate to collect a metric, identify a property, or set a configuration at a particular time, periodically based on a specified period, or based on a specified schedule. The gateway management agent 151 or the IoT protocol client 161a can store a record that specifies the action 183, as well as its commands 184 and parameters 185. The gateway management agent 151 can generate command objects that instruct the IoT protocol client 161a to perform a command 184 according to the parameters 185. The IoT protocol client 161a can transmit an action request 186 to collect a metric, identify or change a property, set a configuration, or otherwise perform the action 183. This can be performed periodically or on the specified schedule based on the commands 184 and parameters 185.

A gateway 111 can also include the capability to execute containers 158 that perform a requested workload. A gateway template 124 can indicate that a gateway client 161 such as the IoT protocol client 161b is enabled, permitted, or whitelisted according to its client identifier 162b. The gateway template 124 or a subsequent command from the management service 120 can indicate that the IoT protocol client 161b is associated with actions 183 and commands 184 to execute, destroy, and otherwise implement containers 158 on the gateway 111. The gateway management agent 151 can register the IoT protocol client 161b in association with the actions 183 and commands 184. The management service 120 can transmit an action message 180 to the gateway management agent 151. The action message 180 can include commands 184, as well as arguments and other parameters 185 for a specified container configuration. The gateway management agent 151 can generate command objects that instruct the IoT protocol client 161b to perform a command 184 according to the parameters 185. The IoT protocol client 161b can implement the commands 184 according the parameters 185 in order to execute, modify, or destroy containers 158. In some cases, the action message 180 can include a network location of an image of the container 158, a name of the container 158, and a function of the container 158. The action message 180 can also specify to collect metrics and perform commands 184 for the container(s) 158 periodically at a certain interval, or on a specified schedule. The action message 180 can also specify the client identifier 162b.

The management service 120 can further cause policies and compliance rules 131 to be implemented on the gateway 111 and IoT devices 113. Policies can include, for example, restrictions or permissions pertaining to capabilities or IoT capabilities 178 of the IoT device 113. For instance, policies can require certain hardware or software functions of the IoT device 113 to be enabled or be disabled during a certain time period or based on a particular location. Policies can require IoT data 190 to be transmitted by the IoT device 113 to be proxied through a particular endpoint of the management service 120. Policies can be implemented by the IoT management process 165. In some cases, the installation or implementation of an enrollment policy can complete an enrollment of the IoT device 113 with the management service 120. In some cases, the gateway 111 can implement the policies by commands or requests transmitted from the gateway 111 to the IoT device 113.

In other examples, an IoT management agent can be installed on the IoT device 113, and the IoT management agent can enforce the policies or compliance rules 131. In some cases, installation of an enrollment policy can complete an enrollment of the IoT device 113. The management service 120 can also transmit various software components to the IoT device 113 which are then installed, configured, or implemented by an IoT management agent. Such software components can include, for example, applications 145, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location.

The management service 120 can transmit various software components to the client device 109 which are then installed, configured, or implemented by the client management agent 147. Such software components can include, for example, additional applications 145, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the client management agent 147.

The management service 120 can transmit commands, requests, and instructions to the IoT device 113 through the gateway 111. The management service 120 can have a command queue storing at least one action to perform on the particular gateway 111 upon check-in of the gateway 111. For instance, the gateway management agent 151 can cause the gateway 111 to check-in with the management service 120, identify an action in the command queue, and perform or implement the action. An action can be the installation of a profile, or the execution of a command or other actions to install software components, implement instructions, update the gateway management agent 151, or implement other commands. In some cases, the gateway management agent 151 can cause a check-in of the gateway 111 periodically, on a schedule, or upon an event, such as changing a state of the gateway 111, installing an application 145 on the gateway 111, upon detecting an IoT device 113, or upon receiving a request to access the network 112 or another request from an IoT device 113.

In one example, the contents of the command queue can include instructions to associate a particular IoT device 113 with a particular gateway template 124. The command can include the gateway template 124 and associated instructions. In another example, the contents of the command queue can include a resource, such as IoT protocol communication instructions, for the gateway management agent 151 to install on the gateway 111. The gateway 111 can access the resource through a specified uniform resource locator (URL) provided in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management agent 151 can cause the gateway 111 to check-in with the management service 120. The gateway management agent 151 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The IoT data 190 can include a stream of at least one tuple including a number and a time stamp. The IoT data 190 can include a sampling function which is a user defined method (udm), a sampling frequency stating the interval between subsequent executions of the udm, and an aggregation count stating how many executions of the udm to aggregate before sending the IoT data 190 to the management service 120. The IoT data 190 can include SI units and a prefix that identifies what the numbers of the stream of IoT data 190 represent. A user interface can be generated based at least in part on the IoT data 190.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 169 that can perform functionalities and execute applications 145. The operating system 169 can be stored in a data store 143 that also includes applications 145, a client management agent 147, and other data. The client device 109 can execute the client management agent 147 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system 169 of the client device 109 can be configured to execute various applications 145, such as a client management agent 147, a browser application, or another application 145. The operating system 169 and some applications 145 can access network content served up by the management system 103, or other servers, thereby rendering a user interface on a display, such as a liquid crystal display (LCD), organic light emitting diode (OLED) display, touch-screen display, or other type of display device.

To this end, some applications 145 can include a browser or a dedicated application 145, and a user interface can include a network page, an application screen, or other interface. The client device 109 can also access web applications using the browser application. Further, other applications 145 can include device management applications, enterprise applications, social networking applications, word processors, spreadsheet applications, media player applications, or other applications 145. The client management agent 147 can perform actions as directed by the management service 120, for instance, by checking in with the management service 120, retrieving a command from the command queue, and implementing the command as discussed above.

The gateway 111 can be representative of one or more gateways 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can execute a gateway management agent 151 and other applications and modules stored in the data store 150. The gateway management agent 151 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, screen boards, kiosks, and other devices and can incorporate processor-based systems, such as a computer system or any other device with like capability. The IoT device 113 can, in some examples, include a headless device without a graphical user interface. Such a headless device can have inputs and outputs through other interfaces like network or serial ports. An IoT device 113 can include an ad board, information board, or other screen board that provides a graphical display but generally does not provide for user interaction with the graphical display and rejects access to system functions. In further cases, an IoT device 113 can include a kiosk or interactive graphical user interface that is locked into a defined functionality and rejects access to system functions. The IoT device 113 can have an operating system 169 or other software that can perform functionalities and execute applications. The operating system 169 can be stored in a data store 163. The IoT device 113 can execute the IoT management process 165 to perform or access the functionality described for the management service 120.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable. The IoT device identifier 173 can include a manufacturer-assigned serial number or a unique device activation identifier generated by the management service 120. The IoT type 176 can include a unique vendor identifier provided by a manufacturer or vendor of the IoT device 113, or a name of the manufacturer or vendor of the IoT device 113.

Figure 2:
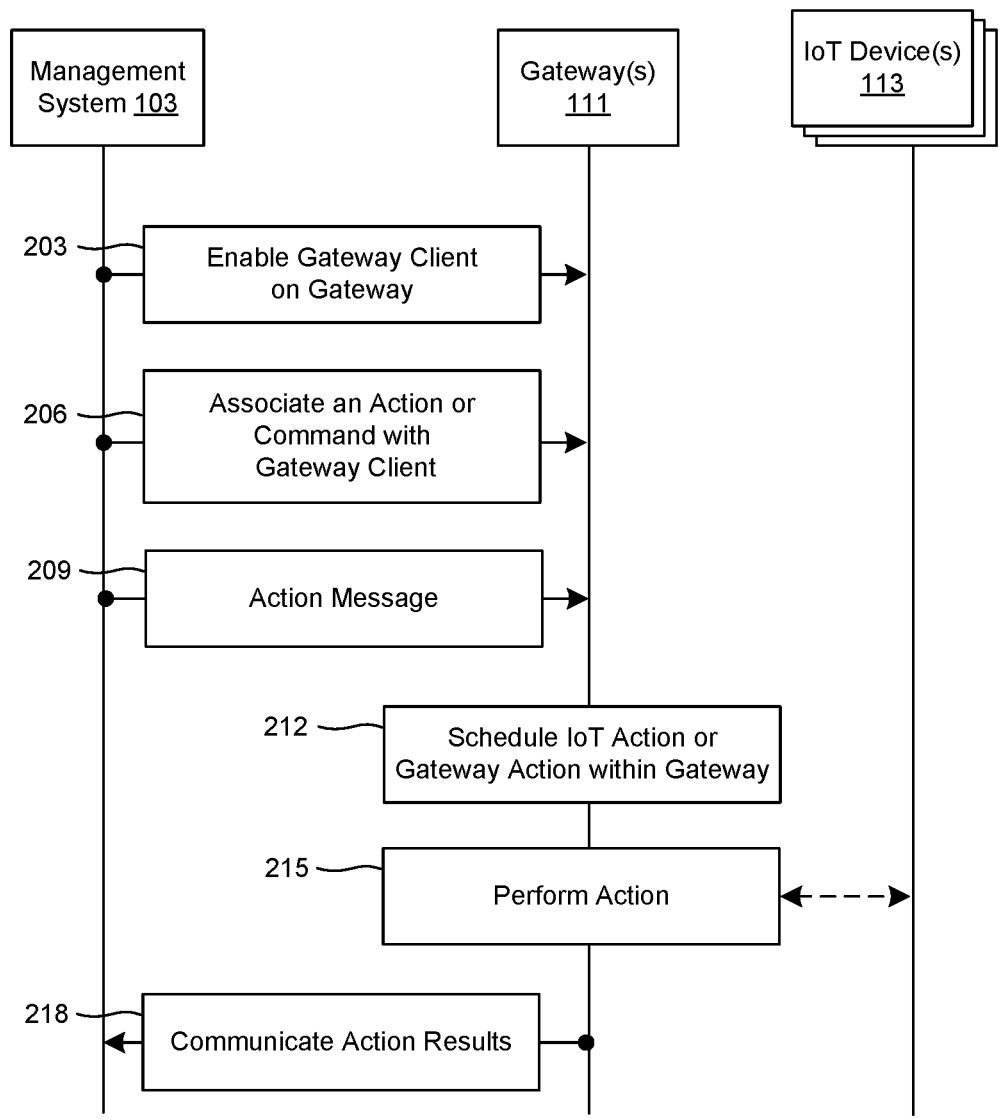
FIG. 2 is a sequence diagram illustrating functionality implemented by components of the networked environment.

FIG. 2 shows a sequence diagram that illustrates steps performed by components of the networked environment 100. Generally, this sequence describes an example implementation of a gateway action framework. The sequence shows how the management system 103 and gateways 111 coordinate to perform actions on the gateways 111 and the IoT devices 113 that are connected through the gateways 111.

In step 203, a gateway client 161 can be enabled on a gateway 111. For example, the management service 120 can update a gateway template 124 to allow the gateway client 161 to be utilized on the gateway 111. For example, the gateway client 161 can be added or included in an allowed clients list of the gateway template 124. The management service 120 can transmit the gateway template 124 or a command to allow the gateway client 161 to the gateway 111. The transmission process can include the gateway management agent 151 checking in to a command queue maintained by the management service 120 to retrieve the gateway template 124 or the command to enable the gateway client 161. In some cases, the management service 120 can transmit a command for the gateway 111 to check in with the management service 120. If the gateway client 161 is not installed on the gateway 111, the gateway management agent 151 can retrieve and install the gateway client 161 to the gateway 111 according to commands from the management service 120. The gateway client 161 can initialize a session with the gateway management agent 151 using its client identifier 162. The gateway management agent 151 can enable or allow the gateway client 161 if the client identifier 162 is included in the allowed clients list of the gateway template 124.

In step 206, the gateway management agent 151 can associate an action 183 or a command 184 with the gateway client 161. The management service 120 can transmit a command to associate a specified action 183 or command 184 with a specified gateway client 161. In other cases, this association can be included in the gateway template 124, or in the gateway client 161.

The gateway management agent 151 can register a command callback function for the gateway client 161. Once the gateway client 161 initializes a session with the gateway management agent 151, it can request to register a command callback function for the specified action 183 or command 184. In some cases, only one client identifier 162 can be associated with each action 183 or command 184 at any time. In other cases, the gateway management agent 151 can register a command callback function for the gateway client 161 according to the gateway template 124 or a command retrieved from the management service 120, and without a request from the gateway client 161. If an action message 180 includes an action 183 or a command 184 corresponding to the command callback function, the gateway management agent 151 can utilize the associated gateway client 161 to perform the action 183. Also, if the action message 180 specifies a gateway client 161, then the gateway management agent 151 can utilize the specified gateway client 161.

In step 209, the management service 120 can transmit an action message 180 to the gateway 111. For example, the management service 120 can place the action message 180 in a command queue for retrieval by the gateway 111. The gateway management agent 151 can retrieve the action message 180. The action message 180 can specify an action 183 that includes commands 184 and parameters 185 for the commands 184. The action message 180 can also include code, notes, and other information for the action 183. The action message 180 can specify a gateway client 161 to perform the action 183.

In step 212, the gateway management agent 151 can schedule an action 183 for the gateway 111 based on the action message 180. The gateway management agent 151 can store the action 183 in the data store 150. The gateway management agent 151 can identify a gateway client 161 to perform the action 183. In some examples, a gateway management agent 151 can identify a gateway client 161 that is specified in the action message 180. Alternatively, the gateway management agent 151 can identify the gateway client 161 based on the action 183 or commands 184 that are specified in the action message 180. The gateway management agent 151 can schedule the action 183 so that the gateway client 161 can access and perform the action 183. For example, the gateway management agent 151 can generate a command object and provide it to the gateway client 161 to perform the action 183.

In step 215 the gateway client 161 can perform the action 183. The action 183 can be performed within the gateway 111 and in conjunction with the IoT devices 113. For example, the gateway client 161 can process an action 183 or command objects to execute containers 158 in the gateway 111 according to a container configuration specified by the commands 184 and parameters 185. The gateway client 161 can also process an action 183 or command objects to collect metrics, identify or change properties, or set configurations of an IoT device 113. The gateway client 161 can transmit a request for the IoT device 113 to perform the action 183. The request can utilize instructions according to an IoT protocol for the IoT device 113. The IoT device 113 can perform the instructions and return metrics, properties, configurations and other IoT data 190 for the IoT device 113, as well as a status message such as a confirmation message or error code.

In step 218, the gateway management agent 151 can transmit an action results message to the management service 120. The action results message can include a result of the action 183 performed by the gateway 111 and in some cases the IoT devices 113. The action results message can include an action status such as an indication of success or failure, as well as statistics and other information, including IoT data 190 and container data for the containers 158.

Figure 3:
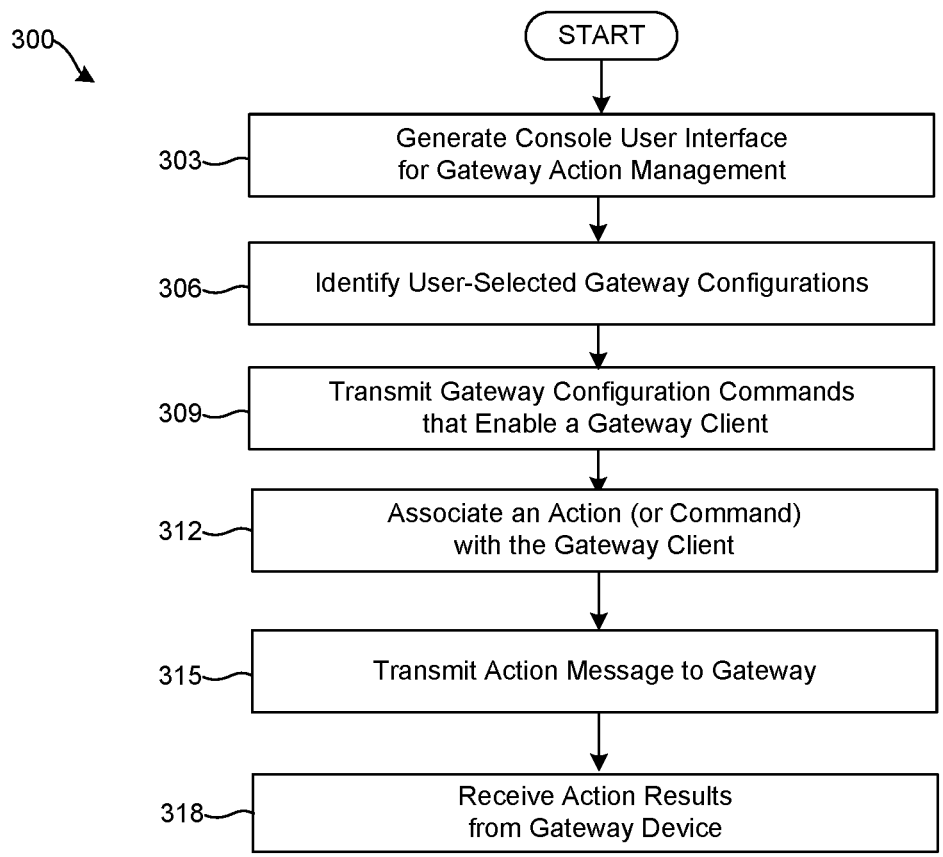
FIG. 3 is a flowchart illustrating functionality implemented by components of the networked environment.

FIG. 3 shows a flowchart 300 that illustrates an example of the operation of the management service 120. Flowchart 300 describes how the management service 120 coordinates with gateways 111 to provide a gateway action framework that manages actions that are performed by the gateway 111, alone and in conjunction with the IoT devices 113.

In step 303, the management service 120 can generate an administrative or console user interface for the gateway action management. For example, the management service 120 can generate a user interface that enables a user to design a gateway template 124 that includes gateway configurations. A user can select a user interface element that initiates creation of the gateway template 124. A name or identifier of the gateway template 124 can be entered through the user interface.

In step 306, the management service 120 can identify user-selected gateway configurations through the console user interface. For example, the user interface can include elements to enter or select gateway clients 161 for inclusion in an allowed clients list of the gateway template 124. The management service 120 can access a list of gateways 111 that are enrolled with the management service 120. The management service 120 can provide a user interface that enables a user to select a subset of the gateways 111. The gateways 111 can be selected or filtered according to gateway type 156, vendor, or gateway identifier. In some cases, the selected gateways 111 can be specified in the gateway template 124. In other situations the set of gateways 111 and their associated gateway templates 124 and can be stored in the device data 125 and device accounts 138.

In step 309, the management service 120 can transmit gateway configuration commands that enable or allow a gateway client 161 to be utilized on the gateway 111. The user interface of the management service 120 can include a user interface element to apply the gateway configuration to a selected set of gateways 111. The management service 120 can place, in a command queue for each of the gateways 111, commands that apply the gateway configuration according to the designed gateway template 124. The gateways 111 can check in, and retrieve the contents of the command queue. In other words, the management service 120 can transmit the commands to apply the gateway configuration to the gateways 111. In some cases, the management services 120 can transmit the gateway template 124 to the gateways 111. The gateway management agent 151 can apply the gateway configuration to the gateway 111 according to the gateway template 124.

In step 312, the management service 120 can associate an action 183 or a command 184 with the gateway client 161. The management service 120 can access a list of actions 183 or a list of commands 184 that can be performed on the gateway 111 and its connected IoT devices 113. The user interface can include a user interface element to enter or select the actions 183 or commands 184 to associate with a gateway client 161. This can be performed at any time, for example, during the initial template creation in step 306, or after the gateway client 161 is enabled on the gateway 111, or another time. The management service 120 can transmit a command to associate the action 183 or a command 184 with the gateway client 161. The gateway management agent 151 can update a local copy of the gateway template 124. Alternatively, the management service 120 can transmit the association by way of the initial gateway template 124 or an updated gateway template 124. Once a gateway client 161 is associated with an action 183 or command 184, the gateway client 161 is designated to perform the action 183 or command 184 on the gateway 111 and connected to the IoT devices 113.

In step 315, the management service 120 can transmit an action message 180 to the gateways 111. The management service 120 can generate a user interface to create or configure an action 183 for an action message 180. The management service 120 can access a list of actions 183 or a list of commands 184 that can be performed on the gateway 111 and its connected IoT devices 113. The action creation user interface of the management service 120 can allow a user to enter or select the actions 183 or commands 184 to perform on a selected gateway 111 or set of gateways 111. Preset actions 183 and commands 184 can include predetermined arguments and other parameters 185. However, the user interface can include elements to edit or enter arguments and other parameters 185 to reconfigure the actions 183 and commands 184 or create new actions 183 and commands 184.

A gateway 111 or set of gateways 111 can be selected or filtered through the user interface according to gateway type 156, vendor, gateway identifier, or gateway template 124. If the action 183 or command 184 is for an IoT device 113, then the management service 120 can access a list of IoT devices 113 that are connected to the selected gateways 111 and can perform a selected action 183 or command 184. All or a subset of the IoT devices 113 can be selected through the user interface. A user interface element to perform the action 183 can be selected and the management service 120 can place an action message 180 in a command queue or otherwise transmit the action message 180 to the gateways 111.

In step 318, the management service 120 can receive action results from the gateways 111. The gateways 111 can receive the action message 180, create command objects for an appropriate gateway client 161, and cause the gateway client 161 to perform an action 183 according to a command 184 and its parameters 185. The gateway client 161 or the gateway management agent 151 can identify whether the action 183 is successful, and can generate an action results message. The action results message can include a result of the action 183 performed by the gateway 111 and in some cases the IoT devices 113. The action results message can include an action status such as an indication of success or failure, as well as statistics and other information, including IoT data 190 and container data for the containers 158.

Figure 4:
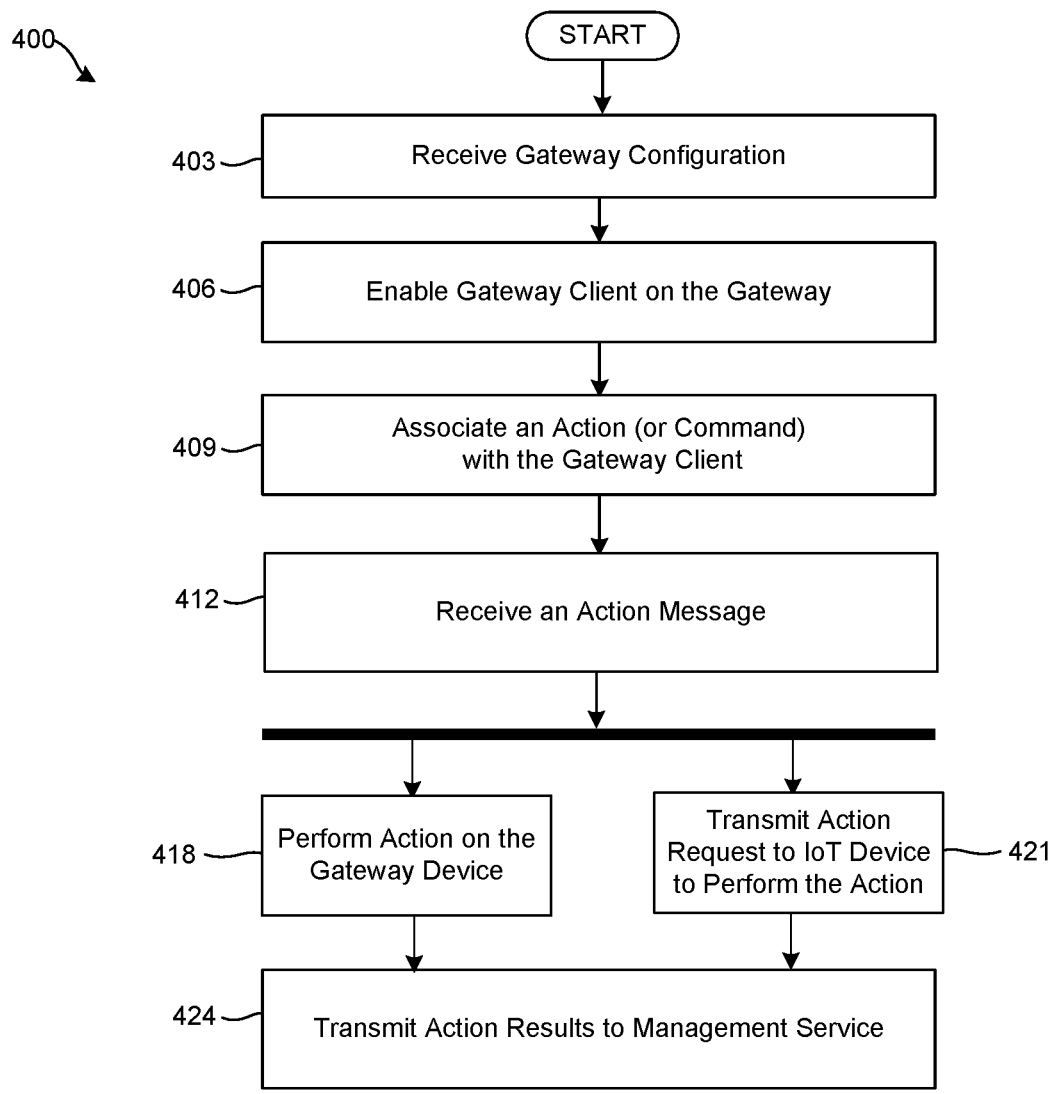
FIG. 4 is a flowchart illustrating functionality implemented by components of the networked environment.

FIG. 4 shows a flowchart 400 that illustrates an example of the operation of the gateway management agent 151. Flowchart 400 illustrates how the gateway management agent 151 coordinates with the management service 120 and IoT devices 113 as part of a gateway action framework that manages actions performed by the gateway 111, alone and in conjunction with the IoT devices 113.

In step 403, the gateway management agent 151 can receive a gateway configuration from the management service 120. The gateway management agent 151 can receive a command to apply a gateway configuration, for example, by retrieving it from a command queue. A gateway configuration can include a set of gateway clients 161 to permit on the gateway 111. The set of gateway clients 161 can be included in an allowed clients list according to their client identifiers 162. The gateway management agent 151 can identify the gateway configuration and update a local copy of the gateway template 124. In some cases, the gateway management agent 151 can receive a gateway template 124 from the management service 120 and install it to the gateway 111. The gateway client 161 entity can be received from the management service 120 separately or along with the gateway configuration or gateway template 124.

In step 406, the gateway management agent 151 can enable a gateway client 161 on the gateway 111. The gateway management agent 151 can identify gateway clients 161 from an allowed clients list, and enable or permit these gateway clients 161 to operate on the gateway 111. In some cases, the gateway management agent 151 can determine whether the gateway client 161 is installed on the gateway 111. If the gateway client 161 is not installed, the gateway management agent 151 can obtain and install the gateway client 161 to the gateway 111. The management service 120 can include a gateway client 161 executable along with the gateway template 124 or another command to enable the gateway client 161. Alternatively, the command or the gateway template 124 can identify a URL or another network location to download the gateway client 161. The gateway client 161 can initialize a session with the gateway management agent 151 using its client identifier 162. The gateway management agent 151 can enable or allow the gateway client 161 if the client identifier 162 is included in the allowed clients list.

In step 409, the gateway management agent 151 can associate an action 183 or a command 184 with the gateway client 161. The management service 120 can transmit a command to associate a specified action 183 or command 184 with a specified gateway client 161. This association can also be included in the gateway template 124, or in the gateway client 161. The gateway client 161 can initialize a session with the gateway management agent 151 and request to register a command callback function for an action 183 or command 184. The gateway management agent 151 can register a command callback function to use the gateway client 161 for the action 183 or command 184. In other cases, the gateway management agent 151 can register a command callback function for the gateway client 161 according to the gateway template 124 or a command retrieved from the management service 120, and without a request from the gateway client 161.

In step 412, the gateway management agent 151 can receive an action message 180 from the management service 120. The gateway management agent 151 can retrieve the action message 180 from a command queue or otherwise receive the action message 180. The action message 180 can specify an action 183, which can include commands 184 and parameters 185. The action message 180 can also include code, notes, and other information for the action 183. The action message 180 can specify a gateway client 161 to perform the action 183.

The gateway management agent 151 can identify a gateway client 161 to perform the action 183. In some examples, the gateway management agent 151 can identify a gateway client 161 that is specified in the action message 180. Alternatively, the gateway management agent 151 can identify the gateway client 161 based on the action 183 or commands 184 that are specified in the action message 180.

The gateway management agent 151 can generate a command object and provide it to the gateway client 161 to perform the action 183.

In step 418, the gateway client 161 can perform the action 183 on the gateway 111. The action 183 can be a gateway action performed and implemented in the gateway 111. For example, the action 183 can specify a container configuration for a container 158. The action 183 can include or reference a container management configuration file or another container configuration. In some cases, the container configuration can be formatted as JSON or another data-interchange format. The action 183 can indicate a configuration directory or a network location, as well as a filename or identifier of the container configuration. The gateway client 161, or a worker process called by the gateway client 161, can read the container configuration and load libraries and options for container management. The gateway client 161 or a worker process can then execute the container 158 in the gateway 111 as specified in the action 183.

In step 421, the gateway client 161 can transmit a request for the IoT device 113 to perform the action 183. The action 183 can be an IoT action performed by the gateway 111 in conjunction with an IoT device 113. The action 183 can specify an IoT type 176, an IoT device identifier 173, and other information related to the IoT device 113. The gateway client 161 or gateway management agent 151 can identify one or more IoT devices 113 that are connected to the gateway 111 and correspond to the IoT type 176, IoT device identifier 173, and other information. The gateway client 161 can process the action 183 to collect metrics, identify properties, change properties, or set configurations of the identified IoT devices 113. The gateway client 161 can transmit a request for the IoT devices 113 to perform the action 183. The IoT device 113 can perform the instructions and return metrics, properties, configurations and other IoT data 190 for the IoT device 113, as well as a status message such as a confirmation message or error code.

In step 424, the gateway management agent 151 can transmit an action results message to the management service 120. The action results message can include a result of the action 183 performed by the gateway 111 and in some cases the IoT devices 113. The action results message can include an action status such as an indication of success or failure, as well as statistics and other information, including IoT data 190 and container data for the containers 158.

Figure 5:
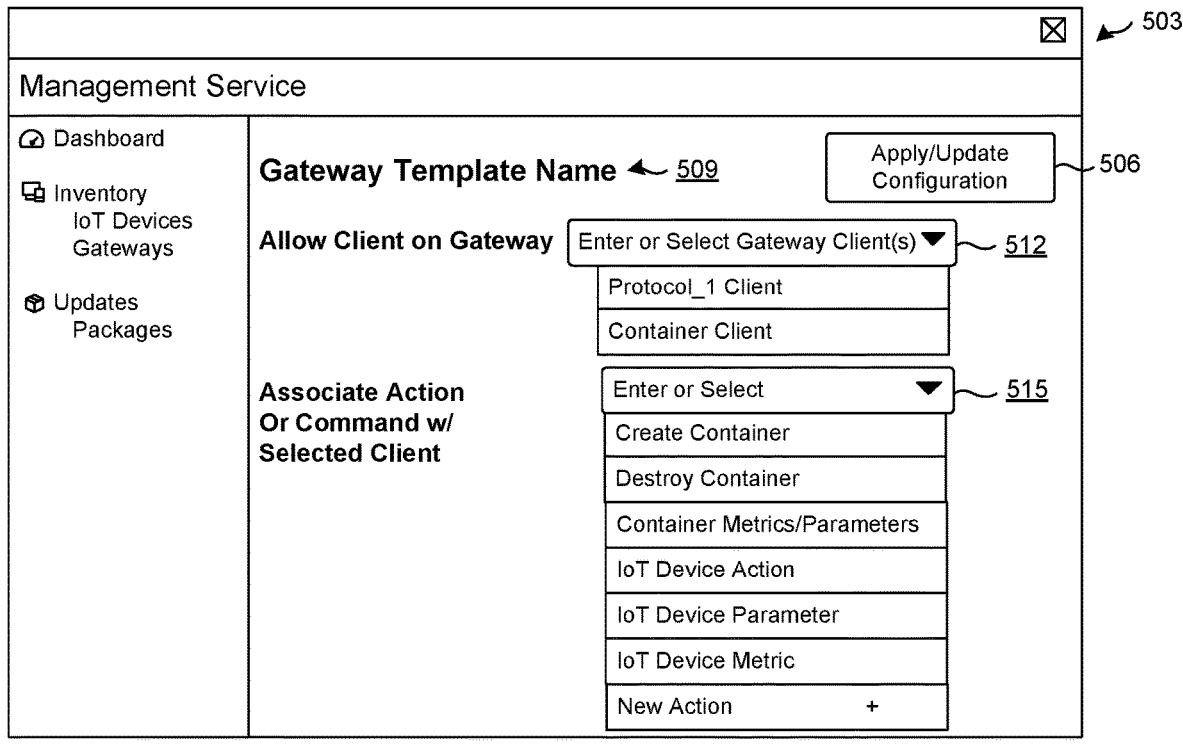
FIG. 5 is a drawing illustrating functionality implemented by components of the networked environment and rendered for display.

FIG. 5 is a drawing that illustrates a graphical user interface 503 generated by the management service 120 and rendered for display. The management service 120 can generate a user interface 503 for access through a display of the management system 103 or can generate the user interface 503 for access over the network 112 using a client device 109.

The user interface 503 can be used to design or customize a gateway template 124. The user interface 503 can include a user interface element 506. When selected, the user interface element 506 can transmit the gateway template 124, or a command to apply a gateway configuration, to a selected set of gateways 111. The user interface 503 can include a user interface element 509, through which a template name or identifier of the gateway template 124 can be entered. The user interface 503 can include a user interface element 512, through which a name or client identifier 162 of a gateway client 161 can be entered for inclusion in an allowed clients list. The user interface 503 can also include a user interface element 515, through which an action 183 or a command 184 can be entered. The management service 120 can associate the selected action 183 or command 184 with the selected gateway client 161. In some examples, this association can be included in the gateway template 124.

Figure 6:
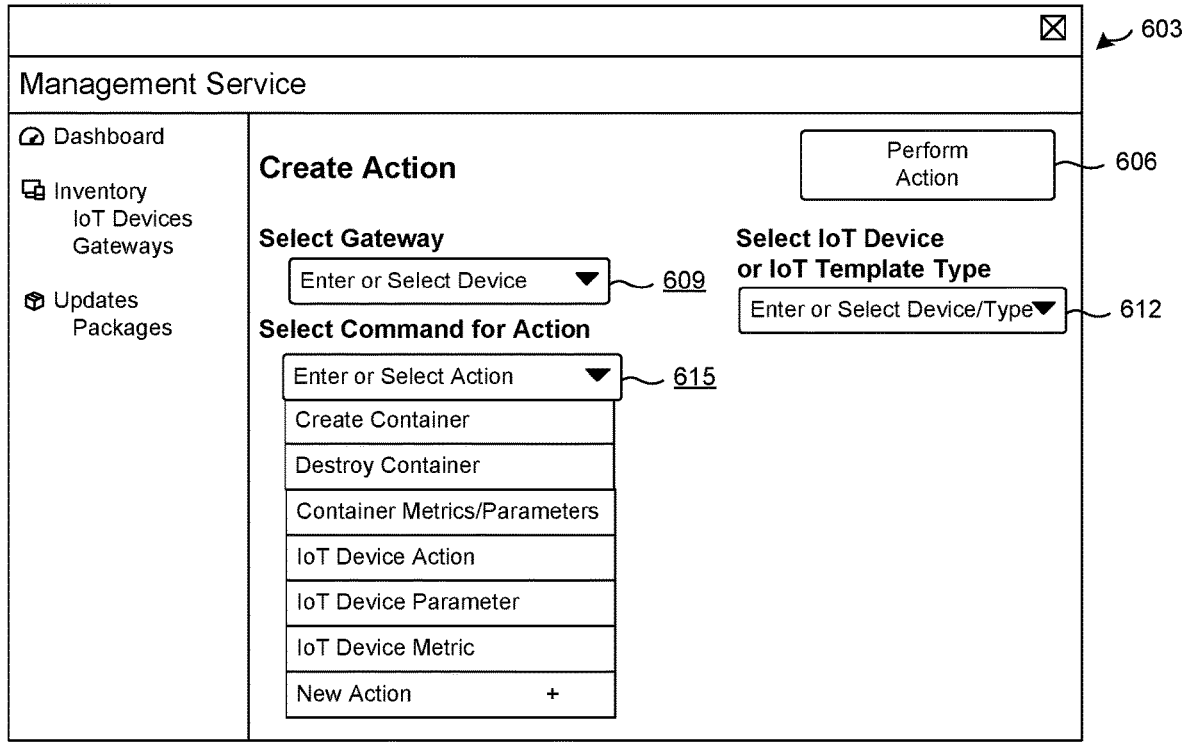
FIG. 6 is a drawing illustrating functionality implemented by components of the networked environment and rendered for display.

FIG. 6 is a drawing that illustrates a graphical user interface 603 generated by the management service 120 and rendered for display. The user interface 603 can be used to design or customize an action 183 for the gateway 111. When selected, a user interface element 606 can transmit the action 183, or an action message 180, to a selected gateway 111. The gateway 111 can be identified using a user interface element 609, through which the gateway 111 can be entered or selected. The user interface 609 can include a user interface element 612 that allows a user to enter or select an IoT device 113 according to IoT device identifier 173, IoT type 176, IoT capabilities 178, or other parameters. The user interface 603 can also include a user interface element 615, through which an action 183 or a command 184 can be entered. The management service 120 can create an action message 180 for an action 183, and specify that the selected gateway 111, and in some cases a selected IoT device 113, be utilized to perform the action 183. In some examples, a user interface element can further allow a user to specify a particular gateway client 161 for the action 183.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices including the management system 103 can include a display upon which user interfaces can be rendered. The IoT devices 113, gateways 111, client devices 109, and devices including the management system 103 can also include one or more input/output devices that can include, for example, a capacitive touchscreen or other type of touch input device, fingerprint reader, or keyboard.

Although the management service 120, gateway management agent 151, and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show are examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts are show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

Therefore, the following is claimed:

1. A system, comprising:
   a gateway device comprising at least one processor and a data store; and
   the data store comprising executable instructions, wherein the instructions, when executed by the at least one processor, cause the gateway device to at least:
   permit a gateway client on the gateway device based on a gateway configuration received from a management service;
   register a command callback function in association with the gateway client;
   receive, from the management service, an action message that specifies an action corresponding to the command callback function;
   identify the gateway client based on the action message;
   generate, based on the action message, a command object for the gateway client; and
   invoke the command callback function, wherein the gateway client processes the command object to perform the action.

2. The system of claim 1, wherein the instructions, when executed by the at least one processor, further cause the gateway device to at least:
   install the gateway client on the gateway device based on the gateway configuration.

3. The system of claim 1, wherein the action message comprises a container configuration for at least one container, and the command object causes the gateway client to execute the at least one container in the gateway device based on the container configuration.

4. The system of claim 1, wherein the action message comprises IoT device instructions, and the command object causes the gateway client to transmit an action request from the gateway device to an IoT device to perform the IoT device instructions.

5. The system of claim 1, wherein the action message comprises at least one of a command or a gateway client identifier, and the gateway client is identified based on the at least one of the command or the gateway client identifier.

6. The system of claim 1, wherein the instructions, when executed by the at least one processor, further cause the gateway device to at least:
   generate an action response based on a result of the action; and
   transmit the action response to the management service.

7. The system of claim 6, wherein the action response comprises at least one of: an IoT device property, an IoT device metric, a container metric of at least one container, a container property of the at least one container, or an error message.

8. A non-transitory computer-readable medium comprising executable instructions for Internet-of-Things (IoT) device onboarding, wherein the instructions, when executed by at least one processor, cause at least one computing device to at least:
   permit a gateway client on a gateway device based on a gateway configuration received from a management service;

register a command callback function in association with the gateway client;

receive, from the management service, an action message that specifies an action corresponding to the command callback function;

identify the gateway client based on the action message;

generate, based on the action message, a command object for the gateway client; and invoke the command callback function, wherein the gateway client processes the command object to perform the action.

9. The non-transitory computer-readable medium of claim 8, wherein the instructions, when executed by the at least one processor, further cause the gateway device to at least:

install the gateway client on the gateway device based on the gateway configuration.

10. The non-transitory computer-readable medium of claim 9, wherein the action message comprises a container configuration for at least one container, and the command object causes the gateway client to execute the at least one container in the gateway device based on the container configuration.

11. The non-transitory computer-readable medium of claim 8, wherein the action message comprises IoT device instructions, and the command object causes the gateway client to transmit an action request from the gateway device to an IoT device to perform the IoT device instructions.

12. The non-transitory computer-readable medium of claim 8, wherein the action message comprises at least one of a command or a gateway client identifier, and the gateway client is identified based on the at least one of the command or the gateway client identifier.

13. The non-transitory computer-readable medium of claim 12, wherein the instructions, when executed by the at least one processor, further cause the gateway device to at least:

generate an action response based on a result of the action; and transmit the action response to the management service.

14. The non-transitory computer-readable medium of claim 13, wherein the action response comprises at least one of: an IoT device property, an IoT device metric, a container metric of at least one container, a container property of the at least one container, or an error message.

15. A method performed by instructions executed by at least one computing device, the method comprising:

permitting a gateway client on a gateway device based on a gateway configuration received from a management service;

registering a command callback function in association the gateway client;

receiving, from the management service, an action message that specifies an action corresponding to the command callback function;

identifying the gateway client based on the action message;

generating, based on the action message, a command object for the gateway client; and invoking the command callback function, wherein the gateway client processes the command object to perform the action.

16. The method of claim 15, further comprising:

installing the gateway client on the gateway device based on the gateway configuration.

17. The method of claim 16, wherein the action message comprises a container configuration for at least one container, and the command object causes the gateway client to execute the at least one container in the gateway device based on the container configuration.

18. The method of claim 15, wherein the action message comprises IoT device instructions, and the command object causes the gateway client to transmit an action request from the gateway device to an IoT device to perform the IoT device instructions.

19. The method of claim 15, wherein the action message comprises at least one of a command or a gateway client identifier, and the gateway client is identified based on the at least one of the command or the gateway client identifier.

20. The method of claim 15, further comprising:

generating an action response based on a result of the action; and transmitting the action response to the management service.

* * * * *